(12) United States Patent
Sipra et al.

(10) Patent No.: US 12,382,279 B2
(45) Date of Patent: Aug. 5, 2025

(54) DEVICE-DRIVEN MOBILITY FOR NON-TERRESTRIAL COMMUNICATION NETWORKS

(71) Applicant: Google LLC, Mountain View, CA (US)

(72) Inventors: Hassan Sipra, San Jose, CA (US); Sathish Karunakaran, Los Altos, CA (US); Sharath Ananth, Cupertino, CA (US); Dutt Kalapatapu, Santa Clara, CA (US); Ankur Jain, Mountain View, CA (US)

(73) Assignee: Google LLC, Mountain View, CA (US)

( * ) Notice: Subject to any disclaimer, the term of this patent is extended or adjusted under 35 U.S.C. 154(b) by 487 days.

(21) Appl. No.: 18/046,820

(22) Filed: Oct. 14, 2022

(65) Prior Publication Data

US 2023/0122365 A1 Apr. 20, 2023

Related U.S. Application Data

(60) Provisional application No. 63/256,826, filed on Oct. 18, 2021.

(51) Int. Cl.
*H04W 8/20* (2009.01)
*H04W 48/04* (2009.01)
*H04W 84/06* (2009.01)
*H04W 88/06* (2009.01)

(52) U.S. Cl.
CPC ............ *H04W 8/20* (2013.01); *H04W 48/04* (2013.01); *H04W 84/06* (2013.01); *H04W 88/06* (2013.01)

(58) Field of Classification Search
CPC .............................. H04W 8/20; H04W 48/04
USPC ........................................................ 455/427
See application file for complete search history.

(56) References Cited

U.S. PATENT DOCUMENTS 11,228,998 B1 * 1/2022 Gupta .................... H04W 8/18

* cited by examiner

*Primary Examiner* — Joel Ajayi
(74) *Attorney, Agent, or Firm* — Honigman LLP; Brett A. Krueger

(57) ABSTRACT

A method includes determining that a user device is located within a specified geographical region, and determining that the user device has an active subscription with a terrestrial network operator operating a terrestrial network within the geographical region, the terrestrial network associated with a primary profile stored on a subscriber identity module of the user device. The method also includes, in response to determining that the user device is located within the geographical region and that the user device has an active subscription with the terrestrial network operator, receiving, from the terrestrial network operator, a secondary profile attached to the active subscription and associated with a non-terrestrial communication network. The method further includes storing the secondary profile on an embedded subscriber identity module on the user device, and communicating via the non-terrestrial communication network using the secondary profile.

18 Claims, 5 Drawing Sheets

DEVICE-DRIVEN MOBILITY FOR NON-TERRESTRIAL COMMUNICATION NETWORKS

CROSS REFERENCE TO RELATED APPLICATION

This U.S. patent application claims priority under 35 U.S.C. § 119(e) to U.S. Provisional Patent Application 63/256,826, filed on Oct. 18, 2021. The disclosure of this prior application is considered part of the disclosure of this application and is hereby incorporated herein by reference in its entirety.

TECHNICAL FIELD

This disclosure relates to non-terrestrial communication networks.

BACKGROUND

Non-terrestrial communication networks, such as satellite-based communication networks, are increasingly popular due to ongoing reductions in satellite launch costs. Satellite-based communication networks directly communicatively couple user devices (e.g., smartphones capable of satellite communications) with satellites. Such satellite connectivity addresses key user needs, such as having reliable and global access to communication services (e.g., voice calls, messaging, Internet access, etc.). Reliable and global access is particularly beneficial for emergency use in areas with poor or limited terrestrial communication network connectivity. For example, such access is important for remote or rural areas with limited or no cellular or WiFi communication network connectivity.

SUMMARY

One aspect of the disclosure provides a computer-implemented method that when executed on data processing hardware causes the data processing hardware to perform operations that include determining that a user device is located within a specified geographical region, and determining that the user device has an active subscription with a terrestrial network operator operating a terrestrial communication network within the specified geographical region, the terrestrial communication network associated with a primary profile stored on a subscriber identity module (SIM) of the user device. The operations also include, in response to determining that the user device is located within the specified geographical region and that the user device has an active subscription with the terrestrial network operator, receiving, from the terrestrial network operator, a secondary profile attached to the active subscription of the user device with the terrestrial network operator and associated with a non-terrestrial communication network. The operations further include storing the secondary profile on an embedded subscriber identity module (eSIM) on the user device, and communicating via the non-terrestrial communication network using the secondary profile.

Implementations of the disclosure may include one or more of the following optional features. In some implementations, the terrestrial communication network includes a cellular communication network. In some examples, the non-terrestrial communication network includes a satellite-based communication network. In some implementations obtaining the secondary profile includes receiving the secondary profile via an over-the-air (OTA) update over the terrestrial communication network. In some examples, a graphical user interface executing on the user device is configured to display a logical profile representing a grouping of the primary profile and the secondary profile. In some examples, communicating via the non-terrestrial communication network includes selecting the non-terrestrial communication network for communications based on a logical geo-fence. Alternatively, the operations further include, after communicating via the non-terrestrial communication network, determining that the terrestrial communication network and the non-terrestrial communication network are both available, and selecting the terrestrial communication network or the non-terrestrial communication network for further communications based on a control policy. Here, the control policy may include selection parameters including at least one of a signal strength, a predicted performance, or a subscription type. In some examples, the operations also include, after communicating via the non-terrestrial communication network, determining that the terrestrial communication network is available, and communicating via the terrestrial communication network using the primary profile for further communications.

In some implementations, the operations further include displaying, via a graphical user interface executing on the user device, a graphical indication of a connection to the non-terrestrial communication network. In some examples, the operations further include displaying, via a graphical user interface executing on the user device, a graphical indication of a reduced set of available communication services.

In some examples, wherein communicating via the non-terrestrial communication network includes scheduling data to be transferred via the non-terrestrial communication network at a future time based on a future availability of the non-terrestrial communication network. Here the future availability of the non-terrestrial communication network may be based on an orbital path of a satellite. In some implementations, communicating via the non-terrestrial communication network includes communicating with a device associated with the terrestrial network operator via an over-the-top data tunnel and the non-terrestrial communication network.

Another aspect of the disclosure provides a user device that includes data processing hardware and memory hardware in communication with the data processing hardware. The memory hardware stores instructions that, when executed on the data processing hardware, cause the date processing hardware to perform operations including determining that the user device is located within a specified geographical region, and determining that the user device has an active subscription with a terrestrial network operator operating a terrestrial communication network within the specified geographical region, the terrestrial communication network associated with a primary profile stored on a subscriber identity module (SIM) of the user device. The operations also includes, in response to determining that the user device is located within the specified geographical region and that the user device has an active subscription with the terrestrial network operator, receiving, from the terrestrial network operator, a secondary profile attached to the active subscription of the user device with the terrestrial network operator and associated with a non-terrestrial communication network. The operations further include storing the secondary profile on an embedded subscriber identity module (eSIM) on the user device, and communicating via the non-terrestrial communication network using the secondary profile.

Implementations of the disclosure may include one or more of the following optional features. In some implementations, the terrestrial communication network includes a cellular communication network. In some examples, the non-terrestrial communication network includes a satellite-based communication network. In some implementations obtaining the secondary profile includes receiving the secondary profile via an over-the-air (OTA) update over the terrestrial communication network. In some examples, a graphical user interface executing on the user device is configured to display a logical profile representing a grouping of the primary profile and the secondary profile. In some examples, communicating via the non-terrestrial communication network includes selecting the non-terrestrial communication network for communications based on a logical geo-fence. Alternatively, the operations further include, after communicating via the non-terrestrial communication network, determining that the terrestrial communication network and the non-terrestrial communication network are both available, and selecting the terrestrial communication network or the non-terrestrial communication network for further communications based on a control policy. Here, the control policy may include selection parameters including at least one of a signal strength, a predicted performance, or a subscription type. In some examples, the operations also include, after communicating via the non-terrestrial communication network, determining that the terrestrial communication network is available, and communicating via the terrestrial communication network using the primary profile for further communications.

In some implementations, the operations further include displaying, via a graphical user interface executing on the user device, a graphical indication of a connection to the non-terrestrial communication network. In some examples, the operations further include displaying, via a graphical user interface executing on the user device, a graphical indication of a reduced set of available communication services.

In some examples, wherein communicating via the non-terrestrial communication network includes scheduling data to be transferred via the non-terrestrial communication network at a future time based on a future availability of the non-terrestrial communication network. Here the future availability of the non-terrestrial communication network may be based on an orbital path of a satellite. In some implementations, communicating via the non-terrestrial communication network includes communicating with a device associated with the terrestrial network operator via an over-the-top data tunnel and the non-terrestrial communication network.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

One popular method of providing communication services in geographic areas with limited or no terrestrial communication network connectivity is to use non-terrestrial communication networks, such as a satellite-based communication network, in geographic areas with limited or no cellular or WiFi communication network connectivity, such as remote or rural areas. In some examples, a non-terrestrial communication network shares the spectrum used by a terrestrial communication network to provide services. However, traditional methods of sharing spectrum require integration of the terrestrial and non-terrestrial communication networks, which increases complexity, increases overhead, and reduces scalability.

Implementations herein provide simplified device-driven methods for alternatively accessing and using terrestrial and non-terrestrial communication networks (also generally referred to herein as simply networks). Disclosed examples enable terrestrial network operators to scalably share their owned spectrum with non-terrestrial networks without having to integrate the terrestrial and non-terrestrial networks. Disclosed examples also enable a terrestrial network operator to control user device access to a non-terrestrial network that shares spectrum used by the terrestrial network and owned by the terrestrial network operator with the terrestrial network.

Figure 1:
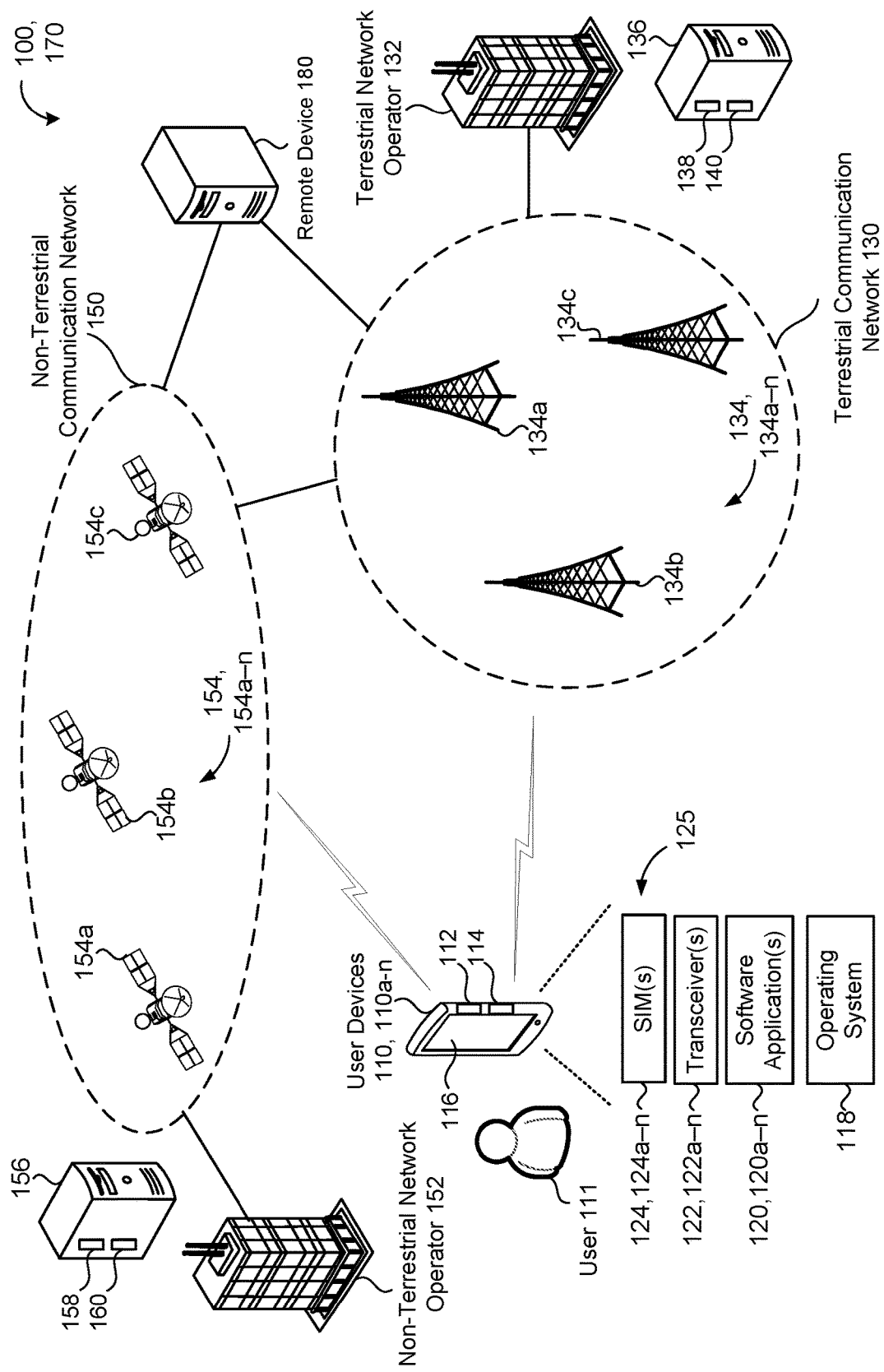
FIG. 1 is a schematic view of an example communication system.

FIG. 1 is a schematic view of an example communication system 100 including a plurality of user devices 110, 110a-n that can alternatively or selectively access communication services provided by a terrestrial communication network 130 and a non-terrestrial communication network 150 within a particular geographic area 170. The terrestrial network 130 and the non-terrestrial network 150 share at least one communication spectrum owned by a terrestrial network operator 132 of the terrestrial network 130. For example, a non-terrestrial network operator 152 of the non-terrestrial network 150 and the terrestrial network operator 132 may have an agreement whereby the non-terrestrial network 150 can use or operate in a communication spectrum owned by the terrestrial network operator 132 within a particular geographic area 170 (e.g., country). In the example shown, the non-terrestrial network 150 is a standalone network (e.g., a network apart from, separate from, or distinct from the terrestrial network 130) with a spectrum sharing agreement with the terrestrial network operator 130. In some examples, the terrestrial network operator 132 does not allow the non-terrestrial network operator 152 to operate in the communication spectrum within other geographic areas. Moreover, the terrestrial network operator 132 may not allow the non-terrestrial network operator 152 to operate in other communication spectra owned by the terrestrial network operator 132 in the geographic area 170. Example communication spectrums include, but are not limited to, frequency bands centered at 700 MHz, 900 MHz, 2.4 GHz, and 5.0 GHz. In some examples, the terrestrial network 130 and the non-terrestrial network 150 simultaneously use the communication spectrum to simultaneously provide communication services to any number and/or type(s) of user devices 110. For example, at any given time, some user devices 110 are communicatively coupled to the terrestrial network 130 while other user devices 110 are communicatively coupled to the non-terrestrial network 150. Example communication services include, but are not limited to, voice, video, audio, audio-visual, messaging, email, and data services.

As used herein, "communicatively coupled," including variations or equivalents thereof, encompasses direct communication and/or indirect communication through one or more intermediary components, and does not require direct mechanical or physical (e.g., wired) communication and/or constant communication, but rather additionally includes selective communication at periodic intervals, scheduled intervals, aperiodic intervals, and/or one-time events. Disclosed implementations are not limited in this context.

In some examples, per an agreement between the network operators 132, 152, the non-terrestrial network 150 is configured to provide to user devices 110 only a subset of the services provided by the terrestrial network 130. For example, to provide only emergency calls and text messaging services but not Internet access. In some examples, services (e.g., messaging services, voice services, etc.) provided via the non-terrestrial network 150 are provided using over-the-top data tunneling over the non-terrestrial network 150 to the terrestrial network's backend. For example, using evolved packet data gateway (ePDG) tunnels. In some implementations, the non-terrestrial network 150 exposes a cloud-based application programming interface (API) framework, and the user devices 110 implement smart switching logic 202 (see FIG. 2) using dual-SIM dual-standby (DSDS). While a single terrestrial network 130 and a single non-terrestrial network 150 are shown in FIG. 1, the communication system 100 may include other terrestrial and/or non-terrestrial networks operating in the same or different communication spectra, and operated by the same or different network operators.

In some examples, the terrestrial network 130 includes a cellular communication network including a plurality of cellular communication towers 134, 134a-n (e.g., evolved NodeBs (eNBs)) that operate in accordance with one or more Long-Term Evolution (LTE) or 5G communication standards. In other examples, the terrestrial network 130 includes a WiFi network including a plurality of wireless access points (not shown for clarity of illustration) that operate in accordance with the Institute of Electrical and Electronics Engineers (IEEE) 802.11x family of standards. However, the terrestrial network 130 may implement other past, present, and/or future communication standards. In some implementations, the non-terrestrial network 150 includes a satellite-based communication network including a plurality of satellites 154, 154a-n (e.g., low earth orbit (LEO) satellites). In some examples, the satellites 154 also operate in accordance with one or more LTE or 5G communication standards, inclusive of radio, core, and Internet transport. However, the non-terrestrial network 150 may implement other past, present and/or future non-terrestrial and satellite communication standards. The non-terrestrial network 150 uses a public land mobile network (PLMN) identifier that is different from the PLMN identifier used by the terrestrial network 130.

The terrestrial network operator 132 may be associated with a computing system 136 such as a server (not shown for clarity of illustration) that includes data processing hardware 138 and memory hardware 140 in communication with the data processing hardware 138 and storing instructions that, when executed by the data processing hardware 138, cause the data processing hardware 138 to perform one or more operations of the terrestrial network operator 132. Similarly, the non-terrestrial network operator 152 may be associated with a computing system 156 such as a server (not shown for clarity of illustration) that includes data processing hardware 158 and memory hardware 160 in communication with the data processing hardware 158 and storing instructions that, when executed by the data processing hardware 158, cause the data processing hardware 158 to perform one or more operations of the non-terrestrial network operator 152.

The user devices 110 may correspond to any user computing devices associated with an end user 111 and capable of receiving input data, processing, and providing output data. Some examples of user devices 110 include, but are not limited to, mobile devices (e.g., mobile phones, tablets, laptops, etc.), computers, wearable devices (e.g., smart watches), smart appliances, internet of things (IoT) devices, vehicle infotainment systems, smart displays, smart speakers, etc. The user devices 110 include data processing hardware 112 and memory hardware 114 in communication with the data processing hardware 112 and storing instructions that, when executed by the data processing hardware 112, cause the data processing hardware 112 to perform one or more operations. In some examples, the data processing hardware 112 executes a graphical user interface (GUI) 116 for display on a screen of the user device 110 in communication with the data processing hardware 112. The data processing hardware 112 further executes an operating system 118 and one or more applications 120, 120a-n.

The operating system 118 may be any of a variety of different operating systems. In examples where a user device 110 is a mobile device, the user device 110 may run an operating system 118 including, but not limited to, ANDROID® developed by Google Inc., IOS® developed by Apple Inc., or WINDOWS PHONE® developed by Microsoft Corporation. Accordingly, the operating system 118 running on a user device 110 may include, but is not limited to, one of ANDROID®, IOS®, or WINDOWS PHONE®. In some examples a user device 110 may run an operating system including, but not limited to, MICROSOFT WINDOWS® by Microsoft Corporation, MAC OS® by Apple, Inc., or Linux.

The user devices 110 further include one or more network transceivers 122, 122a-n that include a baseband processor and one or more antennas (not shown for clarity of illustration) that enable a user device 110 to wirelessly communicate with the terrestrial network 130 and the non-terrestrial network 150, among possibly other wired or wireless networks and/or devices. The network transceiver(s) 122 may include various dedicated components to provide transmit and receive functions (a dedicated processor, dedicated memory, etc.). In some implementations, operations performed by the data processing hardware 112 include implementing a baseband processor for one or more of the network transceiver(s) 122. The network transceiver(s) 122 may include a cellular transceiver that operates in accordance with one or more LTE or 5G communication standards. The network transceiver(s) 122 may also include a WiFi transceiver that operates in accordance with the IEEE 802.11x family of standards. However, the network transceiver(s) 122 may include other network transceivers implemented in accordance with other past, present, and/or future communication standards. The network transceiver(s) 122 communicate in, for example, one or more frequency bands centered at 700 MHz, 900 MHz, 2.4 GHz, and 5.0 GHz etc.

The user devices 110 also include one or more subscriber identification modules (SIMs) 124, 124a-n storing respective profiles 125 for identifying, authorizing, and communicatively coupling a user device 110 with respective communication networks, such as the terrestrial network 130 and the non-terrestrial network 150. An example profile 125 includes, possibly among other data, credentials for authorizing a user device 110 to a communication network such that the user device 110 can become communicatively coupled with the communication network and communicate with other devices (e.g., a remote device 180) via the communication network. In the example shown, a first SIM module 124a includes a SIM card that is inserted into a user device 110 after manufacture and has a SIM integrated circuit (IC) thereon for securely storing a primary profile 125 for accessing the terrestrial network 130; and a second SIM 124b includes an embedded SIM (eSIM) including a SIM IC that is a fixed or integral part of the user device 110 (e.g.,. soldered onto a circuit board of the user device 110 during manufacture) and can be digitally programmed by the user device 110 to securely store a secondary profile 125 for accessing the non-terrestrial network 150. In some examples, the first SIM 124a is pre-programmed with the primary profile 125 and is physically provided by the terrestrial network operator 132, or a representative thereof In some examples, the second eSIM 124b is programmed by a user device 110 responsive to the secondary profile 125 being provided to the user device 110 via, for example, an over-the-air (OTA) communication pushed to the user device 110 over, for example, the terrestrial network 130. However, the primary profile 125 and the secondary profile 125 may be stored on other arrangements of one or more SIMs. In some implementations, the SIM 124a and the eSIM 124b are used in a DSDS configuration with a connectivity services module 204 (see FIG. 2) that enforces a switching policy 202 for alternatively connecting to the networks 130 and 150.

In some examples, the terrestrial network operator 132 provides the secondary profile 125 to a user device 110, such that the terrestrial network operator 132 controls access to the non-terrestrial network 150 even though the non-terrestrial network 150 is operated by the non-terrestrial network operator 152. For example, the terrestrial network operator 132 can, before generating and providing a secondary profile 125 for accessing the non-terrestrial network 150 to a user device 110, verify that the user device 110 (i) includes an eSIM (or other type of SIM) that can be used to securely store the secondary profile 125 for the non-terrestrial network 150; (ii) is currently located within a particular geographic area 170 (e.g., a particular country) in which the terrestrial network operator 132 operates and owns communication spectrum that is shared with the non-terrestrial network 150; and (iii) is associated with a current active subscription with terrestrial network operator 132. In some examples, the terrestrial network operator 132 also provides to the user device 110 switching logic or policy 202 (see FIG. 2). The data processing hardware 112 of the user device 110 can implement the switching logic or policy 202 to determine at any particular time which of the networks 130, 150 the user device 110 is to use to communicate with other devices, such as the remote device 180. Example logic 202 includes use of a logical geo-fence and/or a time-of-day to avoid unnecessary battery power consumption and computationally expensive spectrum scans when it is known or expected that the non-terrestrial network 150 should or cannot currently be used. For example, when there is not currently, or will not be, an overhead satellite 154a-n with which the user device 110 can communicate, the logic 202 automatically precludes use of the non-terrestrial network 150. Other example logic 202 includes determining which network 130, 150 to select for communications with other devices at a particular time when both networks 130, 150 are available (e.g., by using one or more measurements, such as a signal strength, a predicted performance, a predicted usability, and a subscription type). The logic 202, thus, enables the user device 110 to make device-driven mobility changes over time between the networks 130, 150.

In some examples, the communication system 100 determines that a user device 110 is associated with a current active subscription to the terrestrial network operator 132 by generating and maintaining a token that represents that the user device 110 is authorized to access the terrestrial network 130. Here, the token may be used as proof that a user 111 is a valid subscriber of terrestrial network operator 132. In some examples, the communication system 100 determines the token based on an application 120 executing on a user device 110 reading the international mobile subscriber identity (IMSI) from the primary profile 125 and registering the home PLMN of the user's subscription to determine whether the home PLMN belongs to (i.e., is authorized to use) the terrestrial network 130. If so, the application 120 then determines whether the user device 110 is able to successfully probe a validated, pre-determined Internet endpoint connected to the terrestrial network 130 and tracks an elapsed time since the last successful probe. Here, as long the elapsed time is less than a time to live (TTL), which may be defined by a non-terrestrial network policy (e.g., 30 days), the communication system 100 considers the user device 110 to have a current active subscription with the terrestrial network operator 132 and issues a corresponding token. Alternatively, the communication system 100 uses cryptographic entitlement verifications (e.g., EAP-AKA or OIDC/OAUTH computed for the primary SIM 124a) to establish eligibility (i.e., a current active subscription) on a per subscriber basis.

In some examples, some user devices 110 group their primary profile 125 for accessing the terrestrial network 130 with their secondary profile 125 for accessing the non-terrestrial network 150 together as a single logical profile 205 (see FIG. 2) for the user device 110. Thereafter, in some examples, the user device 110 presents only the single logical profile 205 to a user 111 of the user device 110 in user interfaces (UIs) of the user device 110, such that the user 111 is unaware of the secondary profile 125 and/or use of the non-terrestrial network 150. That is, a user device 110 may not present in UIs of the user device 110 indications that the user device 110 can use and switch between the networks 130, 150, or that a switch between the networks 130, 150 has occurred (i.e., the switching is automatic and abstracted away from the user's view). Alternatively, the user device 110 notifies the user 111 of such capabilities and/or switches. For example, the user device 110 displays a graphic 206 (see FIG. 2) in a UI of the user device 110 representing that the user device 110 is currently communicatively coupled to the non-terrestrial network 150 when the user device 110 is currently communicatively coupled to the non-terrestrial network 150. In some examples, when a user device 110 is currently communicatively coupled to a non-terrestrial network 150 that provides fewer services to the user devices 110 than the terrestrial network 130, the user devices 110 provides an indication of reduced services in a UI of the user device 110. For example, the user device 110 may include a graphic 208 (see FIG. 2) in a UI of the user device 110 representing that the user 111 is locked out of (i.e., prevented from using) some services.

In some examples, the user devices 110 perform necessary changes at a platform level to subscribe to data availability notifications that are then used by the user devices 110 for queuing outgoing data and then sending queued data when the non-terrestrial network 150 becomes available. In some implementations, the system 100 uses future network availability window schedules based on predicted orbital paths of the satellites 154 and a user device's location to determine when to queue data and when to send queued data to the non-terrestrial network 150. For example, an application 120 or a user device 110 may schedule a data transfer for 5 minutes in the future when it is known that a satellite 154 will be in a line-of-sight of the user device 110, as opposed to, for example, repeatedly trying and failing to transmit the data during those 5 minutes, which may cause unnecessary battery usage.

In some examples, the user devices 110 include a location module 126 for determining a geographic location of a user device 110. The system 100 may use a geographic location determined by the location module 126 to determine whether a user device 110 is eligible for use of the non-terrestrial network 150 (e.g., that the user device 110 is in a particular geographic area), and/or when to switch between the networks 130, 150. An example location module 126 includes a global positioning satellite (GPS) module. Alternatively, the location module 126 can use signal strengths associated with the cellular towers 134 to triangulate a geographic location of the user device 110.

Figure 2:
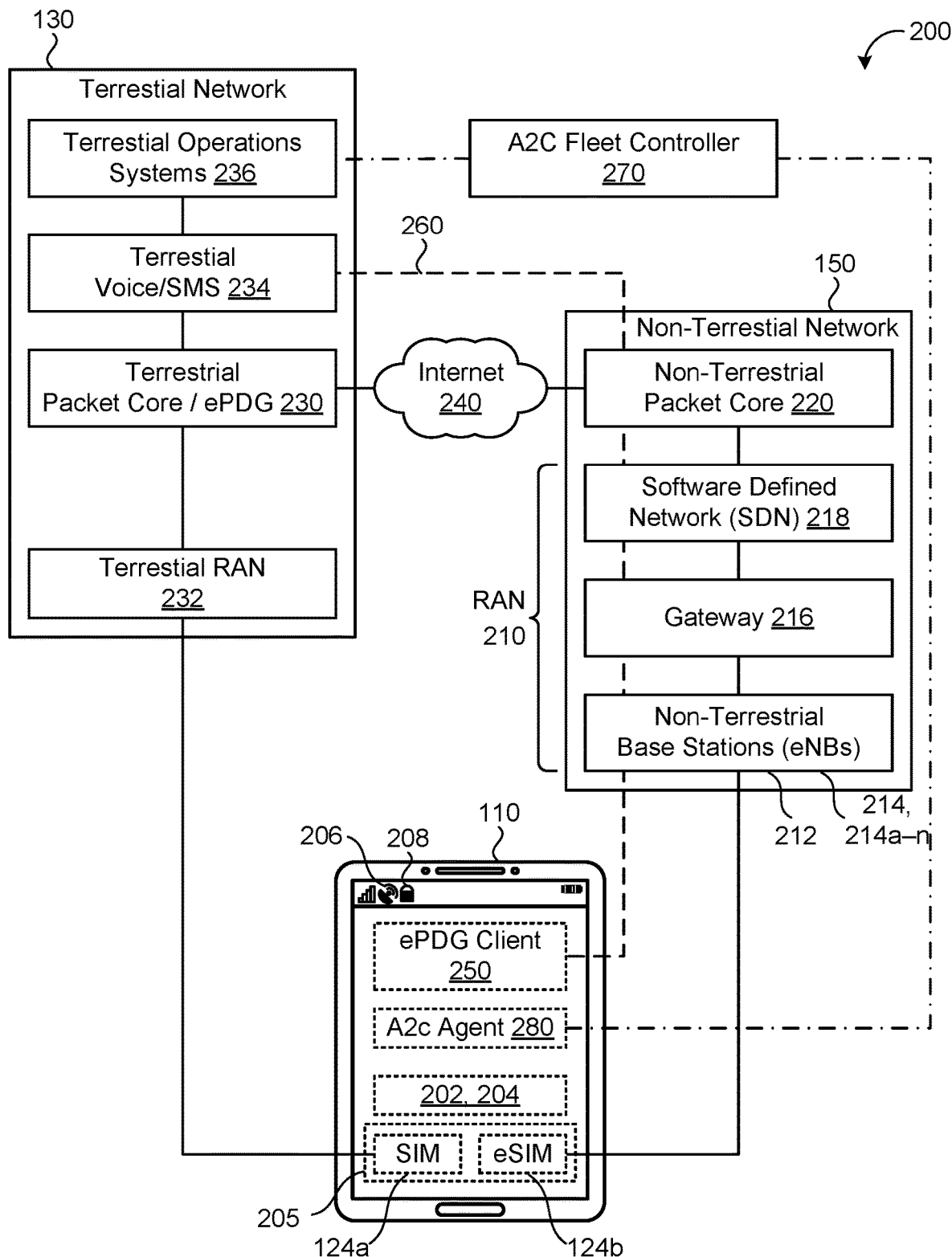
FIG. 2 is a diagram of an example layered network model of the communication system of FIG. 1.

FIG. 2 is a diagram of an example layered network model 200 of the communication system 100 of FIG. 1. In the example shown, the non-terrestrial network 150 includes a radio access network (RAN) 210 layer including a physical layer 212 that includes a plurality of base stations (e.g., eNBs) 214, 214a-n implemented by respective ones of the LEO satellites 154. The RAN 210 also includes a gateway layer 216 for performing address and port translations, and a software defined network (SDN) layer 218 that separates control and forwarding planes. The non-terrestrial network 150 further includes a packet core layer 220 for providing convergence of voice and data on an Internet Protocol (IP) service architecture such that voice traffic (e.g., phone calls) is handled as an IP application. The packet core layer 220 communicates data to and from a corresponding packet core layer 230 of the terrestrial network 130 via, for example, the Internet 240.

In the example shown, the terrestrial network 130 includes the packet core layer 230 for providing convergence of voice and data on an IP service architecture such that voice traffic is handled as an IP application. The terrestrial network 130 also includes a RAN layer 232, a voice/SMS (short message service) service layer 234, and an operations layers 236.

As shown, the packet core layers 220, 230 implement a lightweight data connectivity layer similar to that used for WiFi calling. The non-terrestrial network 150 provides voice and SMS services via overlays in an A2C data layer to the backend of the terrestrial network 130, that is, to the voice/SMS service layer 234 of the terrestrial network 130. For example, an ePDG client 250 on the user device 110 may use an over-the-top tunnel 260 to the voice/SMS service layer 234. By using the over-the-top tunnel 260, there is no need to integrate the networks 130 and 150 because, as shown, they can separate or distinct (e.g., segregated or segmented) with interworking handled through a user equipment (UE) connectivity abstract layer. In some alternatives, the communication system 100 provides messaging (e.g., SMS) using rich communication services (RCS) with SMS fallback, based on a user device's primary phone number. For example, RCS may be dual-registered via a host cloud IP Multimedia Subsystem (IMS) backend provided by the non-terrestrial network 150. The communication system 100 may provide emergency messaging services (e.g., 911 messaging and location reporting) using RCS, with fallback to SMS via home registration using, for example, SMS over IP (SMSoIP) via ePDG.

The network model 200 also includes an A2C fleet controller 270 for providing secondary profiles 125 for the non-terrestrial network 150 and logical subscription group information, as well as the switching logic or policy 202 to the user devices 110 via an A2c-Agent 280 on the user devices 110.

Figure 3:
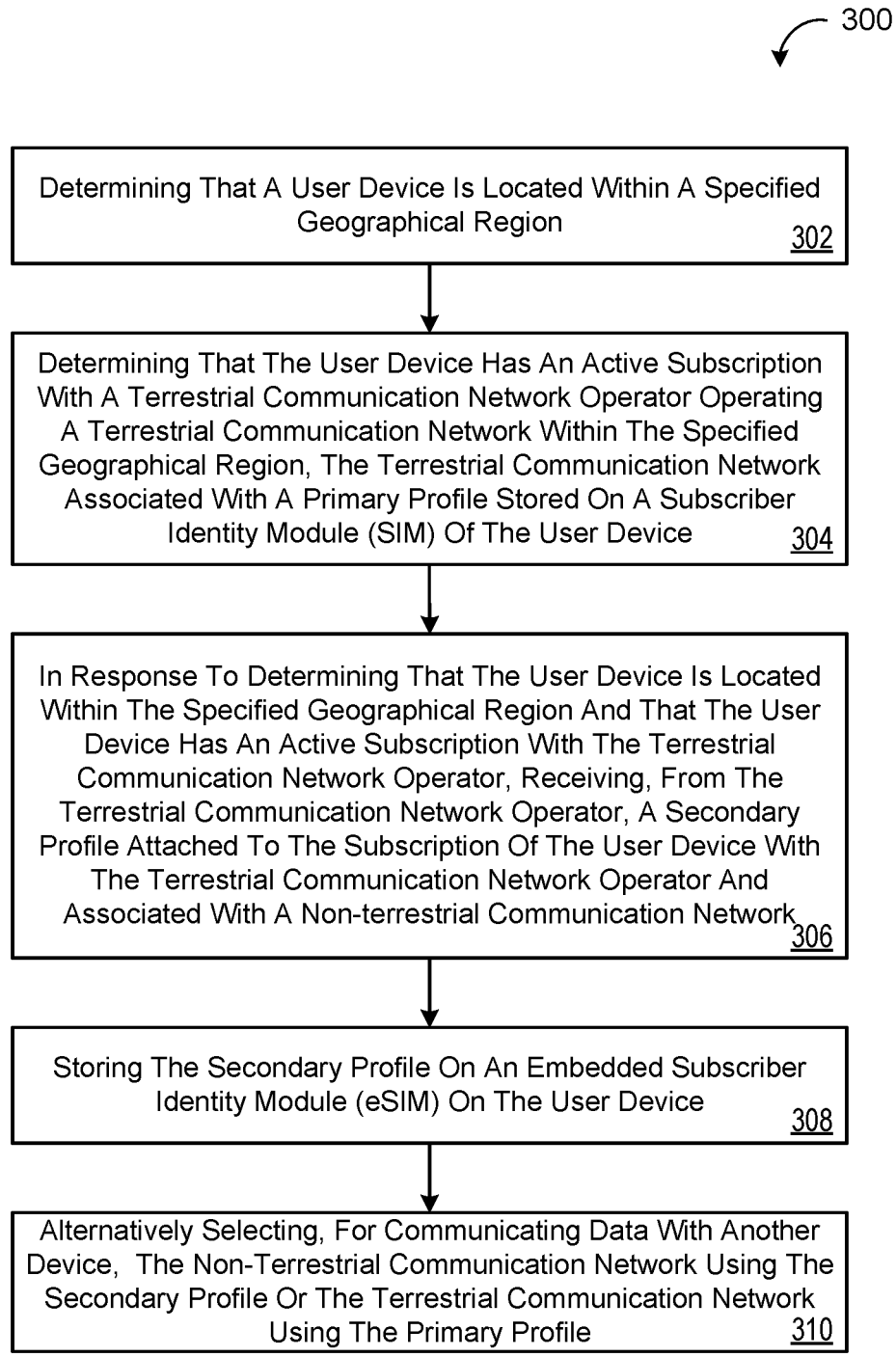
FIG. 3 is a flowchart of an example arrangement of operations for a method of providing device-driven mobility for alternatively accessing terrestrial and non-terrestrial communication networks.

FIG. 3 is a flowchart of an example arrangement of operations for a method 300 of providing device-driven mobility for alternatively accessing terrestrial and non-terrestrial communication networks. The method 300 may be performed by, for example, a user device 110. The method 300 begins at operation 302 with determining that a user device 110 is located within a specified geographical region 170. At operation 304, the method 300 includes determining that the user device 110 has an active subscription with a terrestrial network operator 132 operating a terrestrial communication network 130 within the specified geographical region 170, the terrestrial communication network 130 associated with a primary profile 125 stored on a SIM 124a of the user device 110.

At operation 306, the method 300 includes, in response to determining that the user device 110 is located within the specified geographical region 170 and that the user device 110 has an active subscription with the terrestrial network operator 132, receiving, from the terrestrial network operator 132, a secondary profile 125 attached to the active subscription of the user device 110 with the terrestrial network operator 132 and associated with a non-terrestrial communication network 150. The method 300 at operation 308 stores the secondary profile 125 on an eSIM 124b on the user device 110.

At operation 310, the method 300 includes alternatively selecting, for communicating with another device, the non-terrestrial communication network 150 using the secondary profile 125 or the terrestrial communication network 130 using the primary profile 125.

Figure 4:
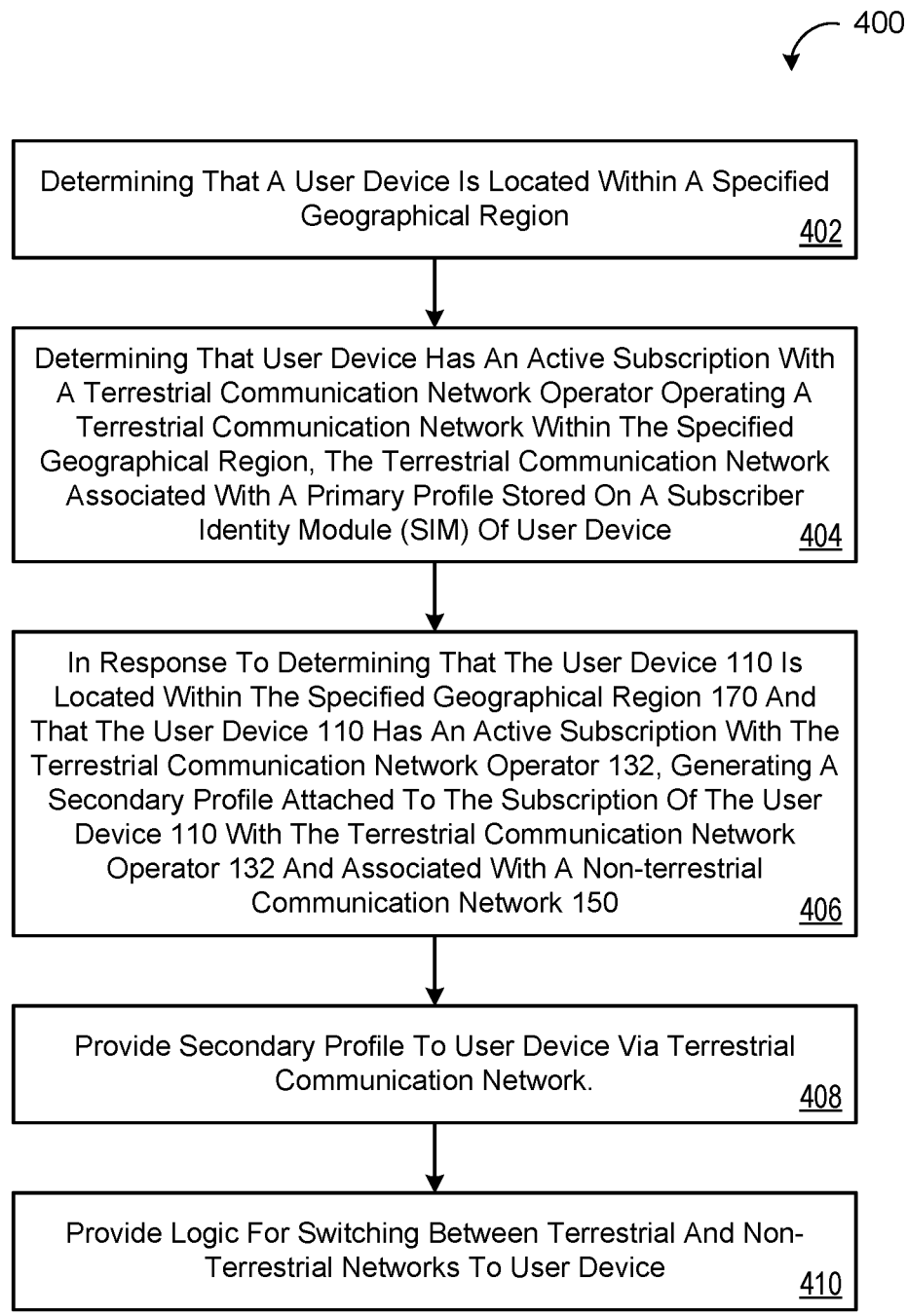
FIG. 4 is a flowchart of an example arrangement of operations for a method of providing alternative access to terrestrial and non-terrestrial communication networks.

FIG. 4 is a flowchart of an example arrangement of operations for a method 400 of providing alternating access to terrestrial and non-terrestrial communication networks. The method 400 may be performed by, for example, the computing system 136 associated with the terrestrial network operator 132. The method 400 begins at operation 402 with determining that a user device 110 is located within a specified geographical region 170. At operation 404, the method 400 includes determining that the user device 110 has an active subscription with a terrestrial network operator 132 operating a terrestrial communication network 130 within the specified geographical region 170, the terrestrial communication network 130 associated with a primary profile 125 stored on a SIM 124a of the user device 110.

At operation 406, the method 400 includes, in response to determining that the user device 110 is located within the specified geographical region 170 and that the user device 110 has an active subscription with the terrestrial network operator 132, generating a secondary profile 125 attached to the subscription of the user device 110 with the terrestrial network operator 132 and associated with a non-terrestrial communication network 150. The method 400 at operation 408 provides the secondary profile 125 to the user device 110 using, for example, OTA communications. At operation 410, the method 400 provides logic for switching between the networks 130 and 150.

Figure 5:
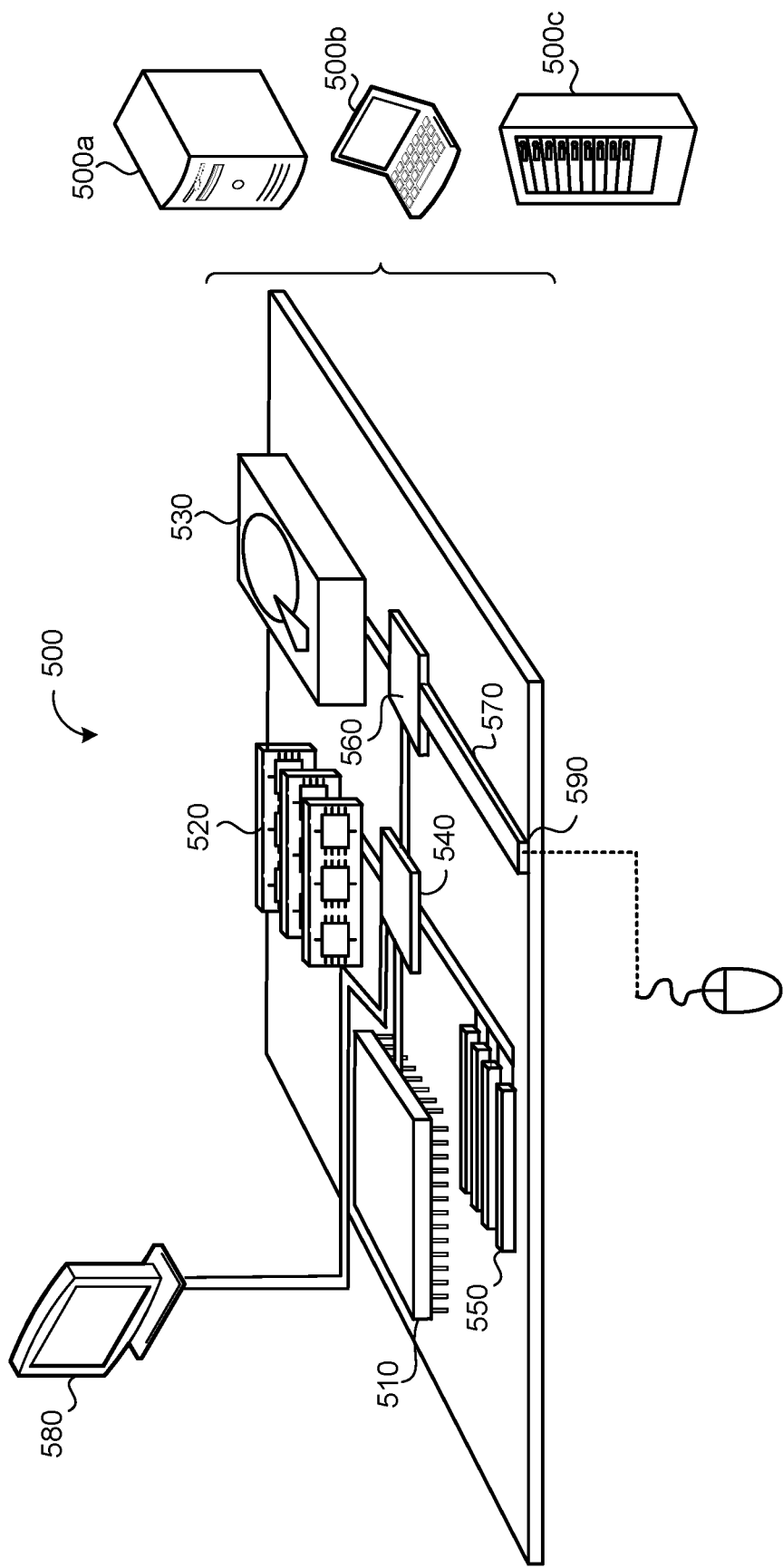
FIG. 5 is a schematic view of an example computing device that may be used to implement the systems and methods described herein.

FIG. 5 is schematic view of an example computing device 500 that may be used to implement the systems and methods described in this document. The computing device 500 may be used to implement the user device 110 and/or the computing system 136 and 156. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510 (i.e., data processing hardware) that can be used to implement the data processing hardware 112, 138 and/or 158, memory 520 (i.e., memory hardware) that can be used to implement the memory hardware 114, 140 and/or 160, a storage device 530 (i.e., memory hardware) that can be used to implement the memory hardware 114, 140 and/or 160, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Unless expressly stated to the contrary, the phrase "at least one of A, B, or C" refers to an inclusive or and not to an exclusive or. For example, "at least one of A, B, or C" refers to any combination or subset of A, B, C such as: (1) A alone; (2) B alone; (3) C alone; (4) A with B; (5) A with C; (6) B with C; and (7) A with B and with C. Moreover, the phrase "at least one of A and B" is intended to refer to any combination or subset of A and B such as: (1) at least one A; (2) at least one B; and (3) at least one A and at least one B.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware of a user device that causes the data processing hardware to perform operations comprising:
determining that the user device is located within a specified geographical region;
determining that the user device has an active subscription with a terrestrial network operator operating a terrestrial communication network within the specified geographical region, the terrestrial communication network comprising a cellular communication network, the terrestrial communication network associated with a primary profile stored on a subscriber identity module of the user device;
in response to determining that the user device is located within the specified geographical region and that the user device has an active subscription with the terrestrial network operator, receiving, from the terrestrial network operator, a secondary profile attached to the active subscription of the user device with the terrestrial network operator and associated with a non-terrestrial communication network, the non-terrestrial communication network comprising a satellite-based communication network;
storing the secondary profile on an embedded subscriber identity module on the user device; and
communicating via the non-terrestrial communication network using the secondary profile,
wherein communicating via the non-terrestrial communication network comprises:
scheduling data to be transferred via the non-terrestrial communication network at a future time based on a future availability of the non-terrestrial communication network, wherein the future availability of the non-terrestrial communication network is based on an orbital path of a satellite, and
communicating with a device associated with the terrestrial network operator via an over-the-top data tunnel and the non-terrestrial communication network.

2. The method of claim 1, wherein obtaining the secondary profile comprises receiving the secondary profile via an over-the-air update over the terrestrial communication network.

3. The method of claim 1, wherein a graphical user interface executing on the user device is configured to display a logical profile representing a grouping of the primary profile and the secondary profile.

4. The method of claim 1, wherein communicating via the non-terrestrial communication network comprises selecting the non-terrestrial communication network for communications based on a logical geo-fence.

5. The method of claim 1, wherein the operations further comprise, after communicating via the non-terrestrial communication network:
determining that the terrestrial communication network and the non-terrestrial communication network are both available; and
selecting the terrestrial communication network or the non-terrestrial communication network for further communications based on a control policy.

6. The method of claim 5, wherein the control policy comprises selection parameters comprising at least one of a signal strength, a predicted performance, or a subscription type.

7. The method of claim 1, wherein the operations further comprise displaying, via a graphical user interface executing on the user device, a graphical indication of a connection to the non-terrestrial communication network.

8. The method of claim 1, wherein the operations further comprise displaying, via a graphical user interface executing on the user device, a graphical indication of a reduced set of available communication services.

9. The method of claim 1, wherein the operations further comprise, after communicating via the non-terrestrial communication network:
  determining that the terrestrial communication network is available; and
  communicating via the terrestrial communication network using the primary profile for further communications.

10. A user device comprising:
  data processing hardware; and
  memory hardware in communication with the data processing hardware, the memory hardware storing instructions that when executed on the data processing hardware cause the data processing hardware to perform operations comprising:
    determining that the user device is located within a specified geographical region;
    determining that the user device has an active subscription with a terrestrial network operator operating a terrestrial communication network within the specified geographical region, the terrestrial communication network comprising a cellular communication network, the terrestrial communication network associated with a primary profile stored on a subscriber identity module of the user device;
    in response to determining that the user device is located within the specified geographical region and that the user device has an active subscription with the terrestrial network operator, receiving, from the terrestrial network operator, a secondary profile attached to the active subscription of the user device with the terrestrial network operator and associated with a non-terrestrial communication network, the non-terrestrial communication network comprising a satellite-based communication network;
    storing the secondary profile on an embedded subscriber identity module on the user device; and
    communicating via the non-terrestrial communication network using the secondary profile,
  wherein communicating via the non-terrestrial communication network comprises:
    scheduling data to be transferred via the non-terrestrial communication network at a future time based on a future availability of the non-terrestrial communication network, wherein the future availability of the non-terrestrial communication network is based on an orbital path of a satellite, and
    communicating with a device associated with the terrestrial network operator via an over-the-top data tunnel and the non-terrestrial communication network.

11. The user device of claim 10, wherein obtaining the secondary profile comprises receiving the secondary profile via an over-the-air update over the terrestrial communication network.

12. The user device of claim 10, wherein a graphical user interface executing on the user device is configured to display a logical profile representing a grouping of the primary profile and the secondary profile.

13. The user device of claim 10, wherein communicating via the non-terrestrial communication network comprises selecting the non-terrestrial communication network for communications based on a logical geo-fence.

14. The user device of claim 10, wherein the operations further comprise, after communicating via the non-terrestrial communication network:
  determining that the terrestrial communication network and the non-terrestrial communication network are both available; and
  selecting the terrestrial communication network or the non-terrestrial communication network for further communications based on a control policy.

15. The user device of claim 14, wherein the control policy comprises selection parameters comprising at least one of a signal strength, a predicted performance, or a subscription type.

16. The user device of claim 10, wherein the operations further comprise displaying, via a graphical user interface executing on the user device, a graphical indication of a connection to the non-terrestrial communication network.

17. The user device of claim 10, wherein the operations further comprise displaying, via a graphical user interface executing on the user device, a graphical indication of a reduced set of available communication services.

18. The user device of claim 10, wherein the operations further comprise, after communicating via the non-terrestrial communication network:
  determining that the terrestrial communication network is available; and
  communicating via the terrestrial communication network using the primary profile for further communications.

* * * * *